(12) United States Patent
Suetomi et al.

(10) Patent No.: US 8,811,033 B2
(45) Date of Patent: Aug. 19, 2014

(54) STRUCTURE AND METHOD FOR MOUNTING PROTECTION PANEL WITH TOUCH INPUT FUNCTION

(75) Inventors: Yoshiko Suetomi, Kyoto (JP); Kazuhiro Nishikawa, Uji (JP); Yoshihiro Kai, Nagaokakyo (JP)

(73) Assignee: Nissha Printing Co., Ltd., Kyoto (JP)

( * ) Notice: Subject to any disclaimer, the term of this patent is extended or adjusted under 35 U.S.C. 154(b) by 268 days.

(21) Appl. No.: 12/922,531

(22) PCT Filed: May 25, 2009

(86) PCT No.: PCT/JP2009/059548
§ 371 (c)(1),
(2), (4) Date: Dec. 13, 2010

(87) PCT Pub. No.: WO2009/145156
PCT Pub. Date: Mar. 12, 2009

(65) Prior Publication Data
US 2011/0103033 A1 May 5, 2011

(30) Foreign Application Priority Data
May 30, 2008 (JP) ................. 2008-143897

(51) Int. Cl.
*H05K 7/02* (2006.01)
*H05K 7/04* (2006.01)
*E05C 5/04* (2006.01)

(52) U.S. Cl.
USPC ......................................... 361/809; 292/251

(58) Field of Classification Search
USPC ........................................................ 411/178
See application file for complete search history.

(56) References Cited

U.S. PATENT DOCUMENTS

| | | | | | |
|---|---|---|---|---|---|
| 2,856,218 | A | * | 10/1958 | Helsel | 403/166 |
| 3,579,942 | A | * | 5/1971 | Cole | 52/787.12 |
| 3,701,302 | A | * | 10/1972 | Pestka et al. | 411/15 |
| 3,756,116 | A | * | 9/1973 | Schuplin | 411/15 |
| 3,778,957 | A | * | 12/1973 | Appleberry | 52/22 |
| 4,082,030 | A | * | 4/1978 | Erickson | 411/15 |
| 4,805,946 | A | * | 2/1989 | Erwin et al. | 292/251 |
| 4,971,500 | A | * | 11/1990 | Benoit et al. | 411/182 |

(Continued)

FOREIGN PATENT DOCUMENTS

| | | |
|---|---|---|
| JP | 1073805 A | 3/1998 |
| JP | 10207630 A | 8/1998 |
| JP | 200156748 A | 2/2001 |
| WO | 2005064451 A1 | 7/2005 |

*Primary Examiner* — Jinhee Lee
*Assistant Examiner* — Xanthia C Cunningham
(74) *Attorney, Agent, or Firm* — The Webb Law Firm (57) ABSTRACT

A mounting structure includes a protection panel (1) with a touch input function for protecting an electronic device display window, mainly formed of the protection panel body made of a resin plate, and a panel fitting portion (32a) of an exterior housing (32) into which the protection panel (1) is fitted from outside so that an outer face of the protection panel (1) is in the same plane as a portion of the exterior housing surrounding the outer face. In this structure, nut mounting holes are formed in a back side rim portion of the protection panel body and nuts (33) each having a female thread formed in an inner periphery thereof are attached to the respective nut mounting holes, and male screws (34) are screwed into the respective female threads of the nuts (33) through throughholes (32b) formed in the panel fitting portion (32a) of the exterior housing (32).

5 Claims, 7 Drawing Sheets

(56) References Cited

U.S. PATENT DOCUMENTS

| | | | |
|---|---|---|---|
| 5,518,078 A * | 5/1996 | Tsujioka et al. | 178/18.05 |
| 5,579,036 A * | 11/1996 | Yates, IV | 345/173 |
| 5,699,324 A * | 12/1997 | Perrot et al. | 368/226 |
| 5,766,255 A * | 6/1998 | Slamin et al. | 623/20.15 |
| 5,977,888 A * | 11/1999 | Fujita et al. | 341/34 |
| 6,213,700 B1 * | 4/2001 | Everard | 411/60.2 |
| 6,553,615 B1 * | 4/2003 | Hansen et al. | 16/2.1 |
| 6,587,097 B1 * | 7/2003 | Aufderheide et al. | 345/173 |
| 6,879,318 B1 * | 4/2005 | Chan et al. | 345/173 |
| 6,884,014 B2 * | 4/2005 | Stone et al. | 411/352 |
| 6,929,291 B2 * | 8/2005 | Chen | 292/251.5 |
| 6,978,521 B2 * | 12/2005 | Morita | 24/303 |
| D513,967 S * | 1/2006 | Terrill et al. | D8/356 |
| 7,008,159 B2 * | 3/2006 | Dendo | 411/182 |
| 7,204,666 B2 * | 4/2007 | Hullman et al. | 411/111 |
| 7,273,227 B2 * | 9/2007 | Kawai et al. | 280/730.2 |
| 7,312,837 B2 * | 12/2007 | Kim et al. | 349/12 |
| 7,554,624 B2 * | 6/2009 | Kusuda et al. | 349/58 |
| 7,830,367 B2 * | 11/2010 | Nishikawa et al. | 345/174 |
| 2002/0036888 A1 * | 3/2002 | Oogami | 361/687 |
| 2003/0190213 A1 * | 10/2003 | Lutkus | 411/178 |
| 2003/0201985 A1 * | 10/2003 | Katakami | 345/173 |
| 2005/0046622 A1 * | 3/2005 | Nakanishi et al. | 345/173 |
| 2005/0047888 A1 * | 3/2005 | Lyon | 411/178 |
| 2005/0051354 A1 * | 3/2005 | Wegner et al. | 174/58 |
| 2005/0121560 A1 * | 6/2005 | Slyter | 248/71 |
| 2005/0139398 A1 * | 6/2005 | Endo | 178/18.01 |
| 2006/0066772 A1 * | 3/2006 | Takahashi et al. | 349/60 |
| 2006/0137294 A1 * | 6/2006 | Waits, Jr. et al. | 52/787.1 |
| 2006/0192767 A1 * | 8/2006 | Murakami | 345/173 |
| 2006/0223346 A1 * | 10/2006 | Fujii et al. | 439/76.2 |
| 2007/0181456 A1 | 8/2007 | Kusuda et al. | |
| 2007/0218957 A1 * | 9/2007 | Nishikawa et al. | 455/566 |
| 2008/0106522 A1 * | 5/2008 | Nishikawa et al. | 345/173 |
| 2009/0033824 A1 * | 2/2009 | Nishikawa et al. | 349/58 |
| 2009/0160819 A1 * | 6/2009 | Sasaki et al. | 345/174 |
| 2009/0219259 A1 * | 9/2009 | Kwon | 345/173 |

* cited by examiner

STRUCTURE AND METHOD FOR MOUNTING PROTECTION PANEL WITH TOUCH INPUT FUNCTION

TECHNICAL FIELD

The present invention relates to a protection panel with a touch input function applied to, for example: portable information terminal, such as PDA and handheld terminal; OA equipments, such as copy machine and facsimile machine; smartphone, mobile phone, portable gaming device, electronic dictionary, car navigation system, compact PC; and various household appliances, and particularly relates to a structure and method for firmly mounting the protection panel to an exterior housing.

BACKGROUND ART

An exterior housing in an electronic device, such as mobile phone and smartphone is typically formed of a combination of a front exterior housing and a rear exterior housing each made of a synthetic resin, and to a surface of the front exterior housing a protection panel is fixed in order to protect a crystalline liquid display window. As the protection panel, a clear and colorless resin panel has been conventionally used. A recent trend is that a decoration, such as printed decoration rims, is introduced along with the emphasis of fashion aspect of the electronic devices.

Figure 17:
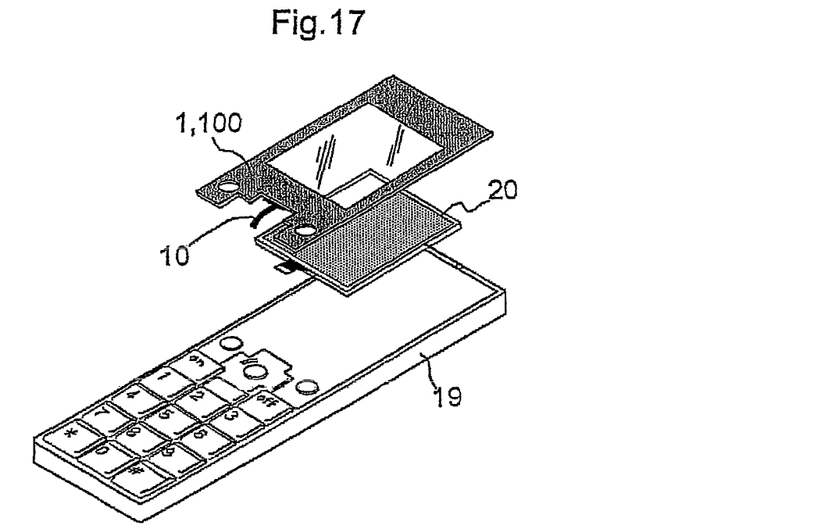
FIG. 17 is a diagram showing a mobile phone having a protection panel functioning as input device.

In addition, recently, the protection panel as shown in FIG. 17 has been expected to have an input device function as a next interface of the mobile phone, and the technique is described, for example, in Patent Document 1.

Figure 18:
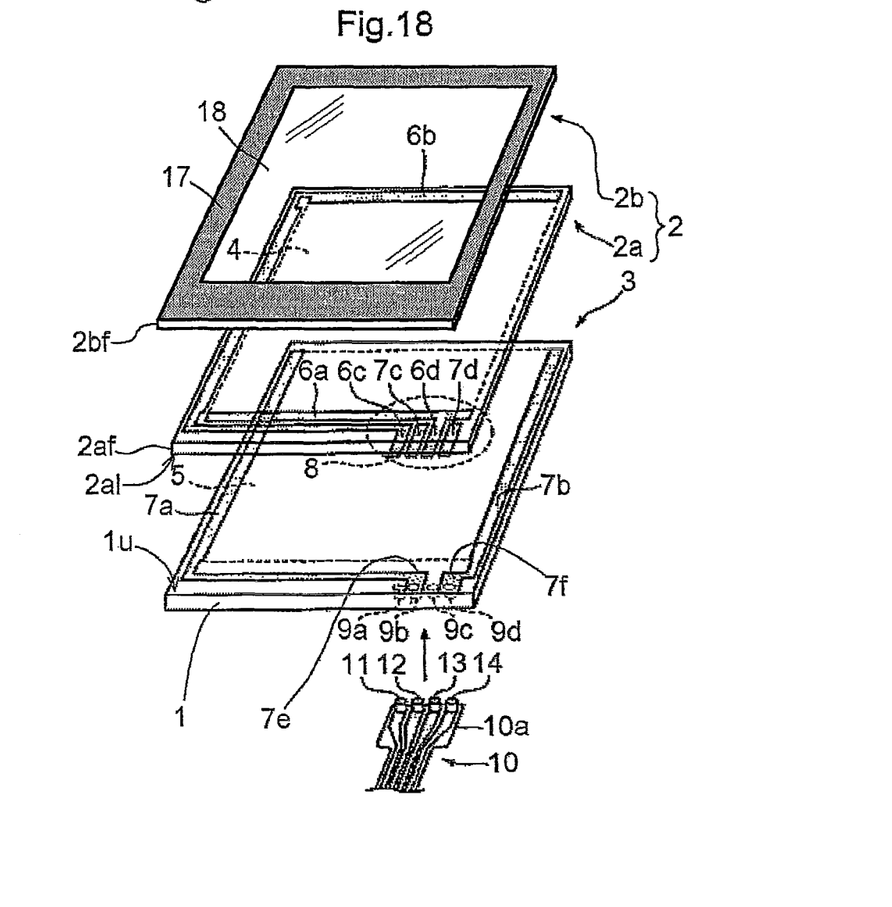
FIG. 18 is an exploded perspective view illustrating one embodiment of a protection panel with a touch input function.

The protection panel with a touch input function for protecting the electronic device display window will be further described in detail using the exploded view of FIG. 18. Referring to this drawing, a protection panel 1 with a touch input function includes: a lower electrode panel 3 having a non-flexible protection panel body, and on an upper face thereof, a lower transparent electrode 5 and lower circuits 7a,7b provided in a portion surrounding the lower transparent electrode 5; an upper electrode sheet 2a having a flexible transparent insulation film, and on a lower face thereof, an upper transparent electrode 4 provided at a position opposingly corresponding to a position of the lower transparent electrode 5, and upper circuits 6a-6d,7c,7d provided in a portion surrounding the upper transparent electrode 4; and a decorative sheet 2b having a flexible transparent insulation film and a decorative layer with a picture 17 for concealing the lower circuits 7a,7b and the upper circuits 6a-6d,7c,7d to form a transparent window 18.

The decorative sheet 2b is stuck together with an entire front face of the upper electrode sheet 2a (hereinafter, lamination of the upper electrode sheet 2a and the decorative sheet 2b is referred to as "movable sheet 2"). When a surface of the decorative sheet 2b is pressed with a finger, stylus or the like, the movable sheet 2 as a whole is bent downward, and as a result, the transparent electrodes 4,5 provided on the opposing faces of the upper electrode sheet 2a and lower electrode panel 3 are brought into contact, and thus an input position is detected.

Figure 19:
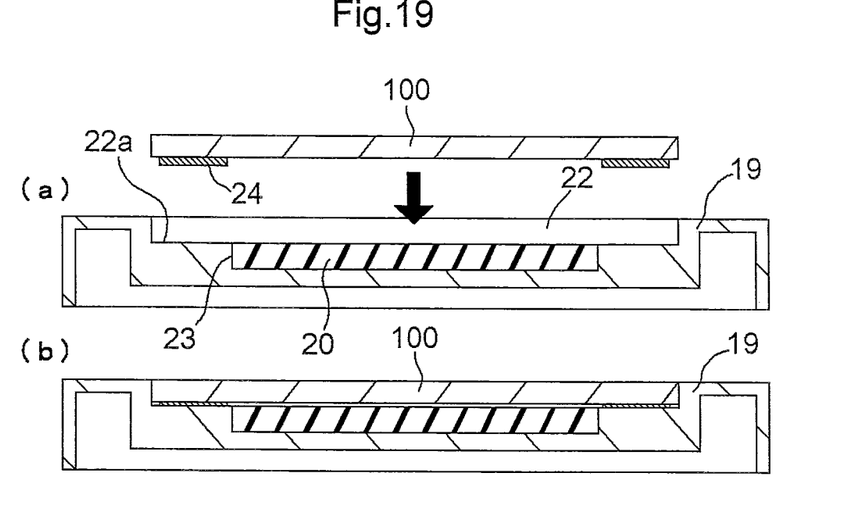
FIG. 19 is a cross-sectional view showing one example of a mounting process of a protection panel with a touch input function according to the prior art technique.

FIG. 19 is a cross-sectional view showing one example of a mounting structure in the front exterior housing a protection panel with a touch input function. As shown in FIG. 19, in a front exterior housing 19, a panel fitting portion 22 is formed in such a manner that a protection panel 100 with a touch input function can be fitted thereinto. A depth of the panel fitting portion 22 is approximately the same as a thickness of the protection panel 100 with a touch input function, so that an outer face of the protection panel 100 is in the same plane as a portion of the front exterior housing 19 surrounding the outer face. In addition, in a bottom face of the panel fitting portion 22, there is provided an opening or recess 23 which is one size smaller than the bottom face, in such a manner that a display unit 20 is viewable from outside through a transparent window. The rim portion 22a of the bottom face supports a rim portion of the protection panel 100 with a touch input function on which the decorative layer is provided.

PRIOR ART DOCUMENT

Patent Document 1: published PCT international publication for patent application in Japanese, WO2005/064451

SUMMARY OF INVENTION

However, in the conventional structure for mounting the protection panel with a touch input function, the protection panel 100 with a touch input function is fixed to the bottom face of the panel fitting portion 22 of the front exterior housing 19 using an adhesive or double-stick tape 24. Therefore, the protection panel 100 with a touch input function is not satisfactorily fixed, and if an electronic device having such a mounting structure is used at high temperature and humidity, the protection panel 100 with a touch input function may warp and easily peel from the front exterior housing 19. Even though the protection panel 100 does not peel, the outer face of the protection panel 100 cannot be in the same plane as the portion of the front exterior housing surrounding the outer face, and a step is sometimes generated between the outer face and the surrounding portion.

Accordingly, the present invention was made with the view toward solving the problems of the prior art techniques, and the present invention provides a mounting structure and a mounting method for more firmly fixing the protection panel with a touch input function to the exterior housing.

In one aspect of the structure of the present invention for mounting a protection panel with a touch input function for protecting an electronic device display window which protection panel is mainly formed of a protection panel body made of a resin plate, in which structure the protection panel is fitted into a panel fitting portion of an exterior housing from outside so that an outer face of the protection panel is in the same plane as a portion of the exterior housing surrounding the outer face, nuts each having a female thread formed in an inner periphery thereof are attached to respective nut mounting holes formed in a back side rim portion of the protection panel body, and male screws are screwed into the respective female threads of the nuts through respective through-holes formed in the panel fitting portion of the exterior housing.

With this configuration, the male screws are screwed into the nuts attached to the nut mounting holes formed in the back side rim portion of the protection panel. Since the protection panel body is screwed from inside the panel fitting portion of the exterior housing in this manner, the protection panel with a touch input function can be more firmly fixed to the exterior housing.

In addition, if the male screws are directly screwed into the holes formed in the back side rim portion of the protection panel and the protection panel is thin, a screw hole formed in the protection panel may not have a sufficient length to firmly fix the protection panel to the exterior housing. However, with the present configuration, even when the thickness of the protection panel is thin, the nuts attached to the nut mounting holes formed in the back side rim portion of the protection panel secures a sufficient length of the screw hole to be engaged with the male screw, and thus the protection panel is firmly fixed to the exterior housing.

In a second aspect of the structure for mounting a protection panel with a touch input function of the present invention, the protection panel with a touch input function includes: a lower electrode panel including the protection panel body which is non-flexible, a lower transparent electrode, and a lower circuit provided in a portion surrounding the lower transparent electrode, the lower transparent electrode and the lower circuit being formed on an upper face of the protection panel body; an upper electrode sheet including a flexible transparent insulation film, an upper transparent electrode provided at a position opposingly corresponding to a position of the lower transparent electrode, and an upper circuit provided in a portion surrounding the upper transparent electrode, the upper transparent electrode and the upper circuit being formed on a lower face of the insulation film, the upper electrode sheet being stuck to the lower electrode panel at rim portions with a gap between the electrodes; and a decorative sheet including a flexible transparent insulation film, a decorative layer for concealing the lower circuit and the upper circuit to form a transparent window, the decorative layer being provided on at least one face of the insulation film, the decorative sheet being stuck to the upper face of an upper electrode sheet.

With this configuration, the decorative sheet has the decorative layer on at least one face of the flexible transparent insulation film and is stuck to the upper face of the upper electrode sheet, and thus nut mounting holes, nuts and male screws formed in the back side rim portion of the protection panel can be surely concealed from view.

In an aspect of the method of the present invention for mounting a protection panel with a touch input function for protecting an electronic device display window which protection panel is mainly formed of a protection panel body made of a resin plate, by fitting the protection panel into a panel fitting portion of an exterior housing from outside so that an outer face of the protection panel is in the same plane as a portion of the exterior housing surrounding the outer face, the method includes: a step of attaching nuts each having a female thread formed in an inner periphery thereof to respective mounting holes formed in a back side rim portion of the protection panel body; a step of fitting the protection panel into the panel fitting portion of the exterior housing from outside; and a step of screwing male screws into the respective female threads of the nuts through respective through-holes formed in the panel fitting portion of the exterior housing.

With this configuration, the male screws are screwed into the nuts attached to the nut mounting holes formed in the back side rim portion of the protection panel. Since the protection panel body is screwed from inside the panel fitting portion of the exterior housing in this manner, the protection panel with a touch input function can be more firmly fixed to the exterior housing.

In addition, if the male screws are directly screwed into the holes formed in the back side rim portion of the protection panel and the protection panel is thin, a screw hole formed in the protection panel may not have a sufficient length to firmly fix the protection panel to the exterior housing. However, with the present configuration, even when the thickness of the protection panel is thin, the nuts attached to the nut mounting holes formed in the back side rim portion of the protection panel secures a sufficient length of the screw hole to be engaged with the male screw, and thus the protection panel is firmly fixed to the exterior housing.

DESCRIPTION OF EMBODIMENTS

Hereinbelow, the present invention will be described in detail with reference to the embodiments shown in the drawings.

Figure 1:
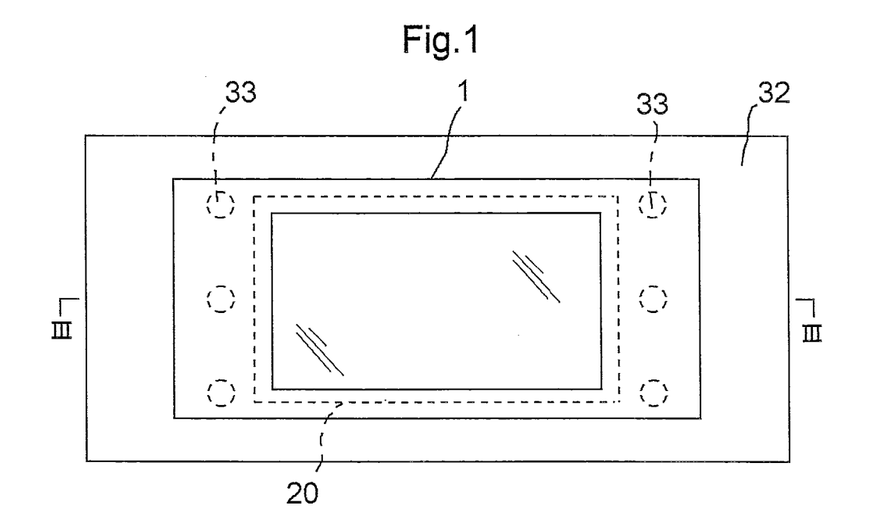
FIG. 1 is a plan view showing one embodiment of a structure for mounting a protection panel with a touch input function according to the present invention.
Figure 2:
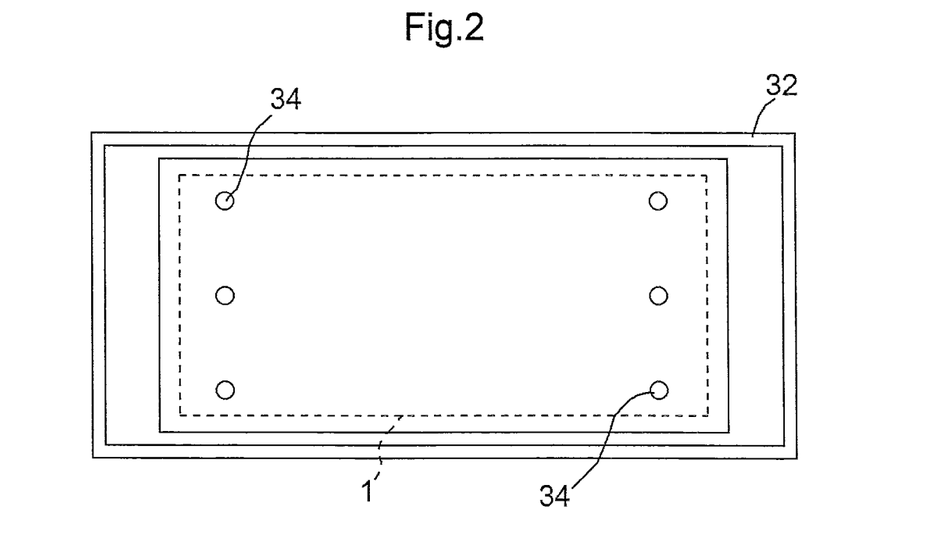
FIG. 2 is a bottom view showing the mounting structure of FIG. 1.
Figure 3:
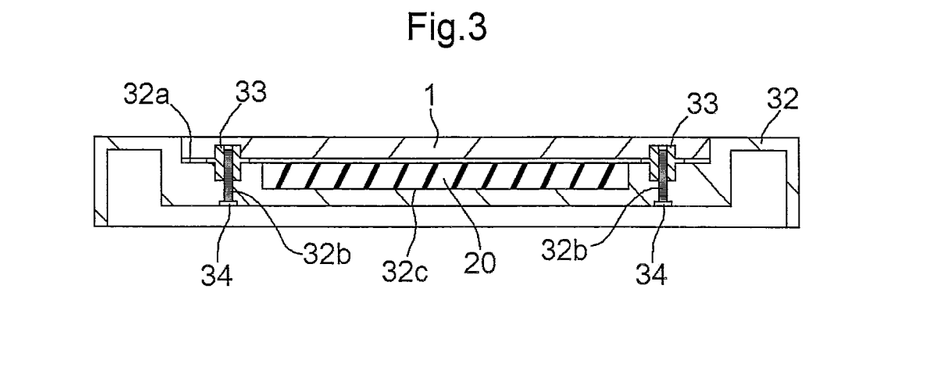
FIG. 3 is a cross-sectional view of the mounting structure of FIG. 1 taken along a line III-III.

FIG. 1 is a plan view showing one embodiment of a structure for mounting a protection panel with a touch input function according to the present invention. FIG. 2 is a bottom view showing the mounting structure of FIG. 1. FIG. 3 is a cross-sectional view of the mounting structure of FIG. 1 taken along a line III-III.

A protection panel 1 with a touch input function for protecting the electronic device display window shown in FIGS. 1-3 is mainly formed of a protection panel body made of a resin plate. Components other than the protection panel body, which is the lowermost layer of the protection panel 1, will be described later, and herein only the protection panel body will be described. The protection panel body is typically a resin plate in an approximate rectangle having a thickness of approximately 0.5 mm-1.0 mm. Examples of the material include engineering plastics, such as polycarbonates, polyamides, and polyetherketones; and acrylic, polyethylene terephthalate, and polybutylene terephthalate.

As shown in FIGS. 1 and 3, nuts 33 are attached to a back side rim portion of the protection panel body, by press-fitting or the like. The nut 33 is used for the purpose of indirectly making a female thread, when it is difficult to tap a female thread in a material due to a property of the material. The protection panel body of the protection panel 1 with a touch input function is a thin plate made of resin, and a thickness may be as thin as approximately 0.5 mm. In the case of such a thin plate, it is difficult to tap a female thread with a required length, and in order to obtain the female thread with the required length, the nut 33 separate from the protection panel body is attached to the back side rim portion of the protection panel body. In addition, a sufficient strength can be secured as compared with the case where a female thread is directly tapped in the protection panel body made of resin.

Figure 10:
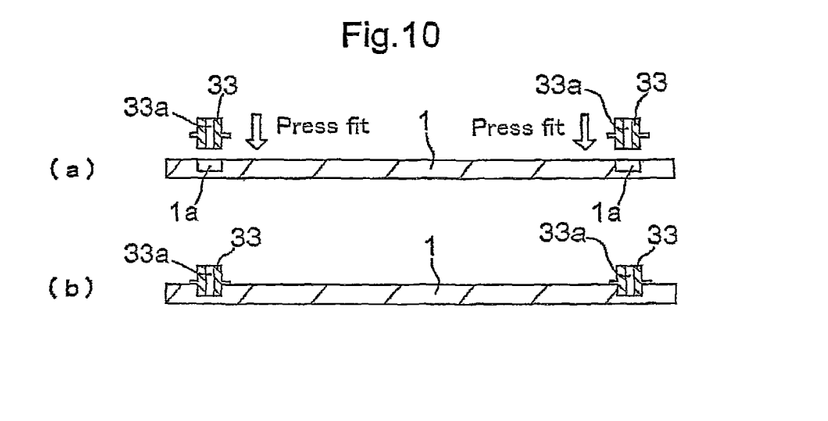
FIG. 10 is a cross-sectional view showing one embodiment of a mounting process of the protection panel with a touch input function according to the present invention.

The attachment of the nut 33 is performed, for example, by forming nut mounting holes 1a corresponding to the nuts 33 in the back side rim portion of the protection panel body and by press-fitting the nuts 33 into the respective nut mounting holes 1a. In FIG. 10, (a) and (b) are sequential diagrams showing one embodiment of a step for attaching the nuts 33 to the protection panel body of the protection panel 1 with a touch input function, by press-fitting the nuts 33 into the respective nut mounting holes 1a formed in the back side rim portion. In these drawings, a back side of the protection panel body, which is the lowermost layer of the protection panel 1, is oriented upward.

Figure 11:
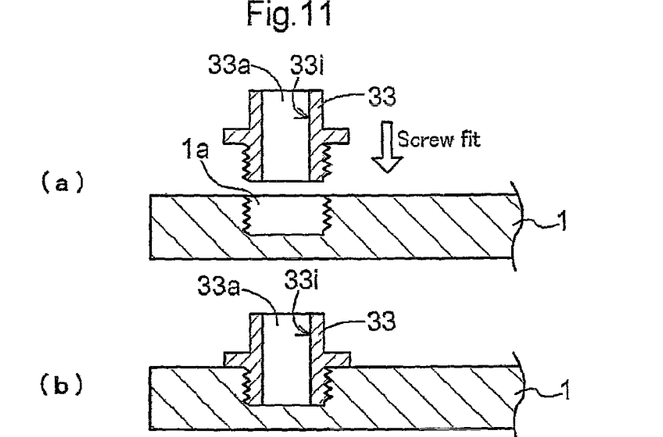
FIG. 11 is a cross-sectional view showing another embodiment of the mounting process of the protection panel with a touch input function according to the present invention.
Figure 12:
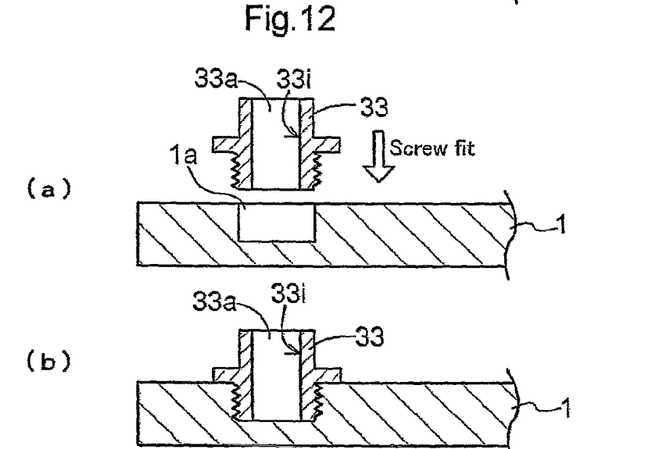
FIG. 12 is a cross-sectional view showing still another embodiment of the mounting process of the protection panel with a touch input function according to the present invention.

The attachment of the nut 33 to the protection panel 1 may be performed by, as shown in FIGS. 11 and 12, threading an outer periphery of the nut 33, and screwing and fitting the nut 33 into the nut mounting holes 1a. In FIG. 11, both the outer periphery of the nut 33 and the nut mounting hole 1a are threaded. In FIG. 12, the outer periphery of the nut 33 is threaded while the nut mounting hole 1a is not. In this case, an outer diameter of the nut 33 is made smaller than an inner diameter of the nut mounting hole 1a, and the nut 33 is frictionally screwed and fitted into the nut mounting hole 1a.

Figure 13:
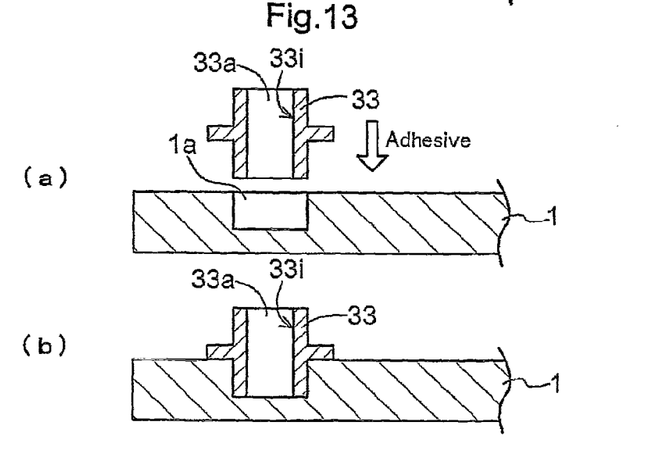
FIG. 13 is a cross-sectional view showing still another embodiment of the mounting process of the protection panel with a touch input function according to the present invention.

Alternatively, as shown in FIG. 13, the nut 33 may be attached to the protection panel 1 by adhering the nut 33 to the nut mounting hole 1a using various adhesives or the like.

It should be noted that the nut mounting hole 1a may penetrate through the protection panel body, but should never reach an outer face of the protection panel 1. The reason is that, since the outer face of the protection panel 1 forms a portion of the housing in such a manner that the outer face is in the same plane as a portion of the housing surrounding the outer face, the exposure of the nut mounting hole 1a to outside notably deteriorates the appearance. In addition, it is preferable that the nut mounting hole 1a does not penetrate through the protection panel body, which is the lowermost layer of the protection panel 1. The reason is that, if the nut mounting hole 1a penetrates through the protection panel body, a wiring space in a front face of the protection panel body for imparting a touch input function becomes small. In addition, in the protection panel body of the present invention, it is preferable that a distance between a rim of the nut mounting hole 1a and a contour of the protection panel body is 0.5 mm or more. If this distance is less than 0.5 mm, satisfactory peel strength cannot be obtained with respect to the attached nuts 33.

The nut 33 typically includes a cylindrical barrel portion 33b having a female thread 33a formed in an inner periphery thereof; and a protrusion 33d or recess for engagement which is formed in a portion on an outer periphery at a position close to one end, in other words, a portion to be buried in the base material (in the present invention, a thin plate made of resin as the protection panel body). The female thread 33a may be formed to have a diameter of 1.5 mm, and a length of 2.5 mm. It should be noted that the nut may be selected from a wide range of commercially available nuts, which may be called various names other than press-fit nut. Examples of the material for the nut 33 include iron, stainless steel, brass and hard plastic.

Figure 6:
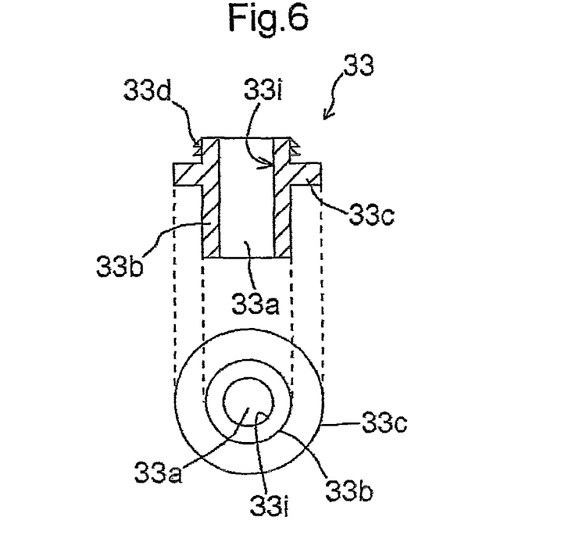
FIG. 6 is a diagram showing one embodiment of a nut used in the present invention.

FIG. 6 is a diagram showing one embodiment of the press-fit nut 33 used in the present invention. The press-fit nut 33 shown in FIG. 6 includes: the cylindrical barrel portion 33b having the female thread 33a formed in the inner periphery thereof; and the protrusion 33d for engagement which is formed in a portion on an outer periphery at a position close to one end, in other words, a portion to be buried in the protection panel body. In addition, at a position away from the protrusion 33d towards the other end on the outer periphery of the press-fit nut 33, a flange 33c which determines a buried amount of the press-fit nut 33 into the protection panel body is integrally formed with the press-fit nut 33. It may be sufficient if the flange 33c extends from the barrel portion 33b to be buried by approximately 1-2 mm. In an inner wall 33i of the cylindrical barrel portion 33b, the female thread 33a is provided. With the female thread 33a, a male screw is engaged so as to fix other components.

The press-fitting attachment of the press-fit nut 33 to the protection panel 1 is performed by applying ultrasonic vibration and pressure to the press-fit nut 33 during press-fitting. When the ultrasonic vibration and pressure is applied to the press-fit nut 33, frictional heat is generated at an interface between the press-fit nut 33 and the nut mounting hole 1a, and a portion surrounding the nut mounting hole 1a will be molten or deformed. In this situation, the protrusion 33d for fastening provided on the outer periphery of the press-fit nut 33 is received in a portion surrounding the nut mounting hole 1a, and strengthen the bonding between the protection panel body and the press-fit nut 33 after the portion surrounding the nut mounting hole 1a is re-solidified. In the case of the press-fit nut having a recess for fastening, the molten resin enters the recess. It may be sufficient if the protrusion 33d or recess for fastening has a size of approximately 0.1 mm.

Figure 7:
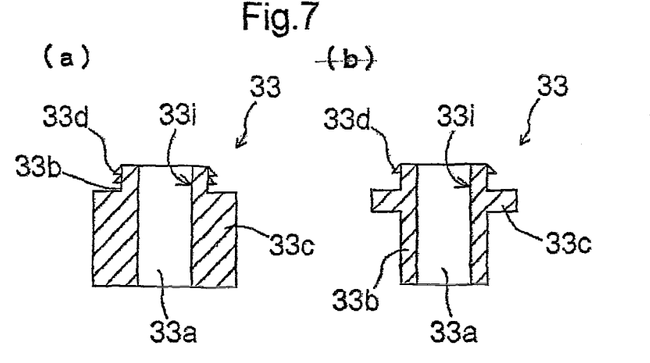
FIG. 7 is a diagram showing another embodiment of the nut used in the present invention.

It should be noted that, in FIG. 6, the protrusion 33d is formed of two ridges, and alternatively, may be formed of one ridge (see FIG. 7 (b)) or three or more ridges. Also in FIG. 6, the flange 33c is formed in only a portion of the outer periphery of the press-fit nut 33 adjacent to the protrusion 33d. Alternatively, the flange 33c may be extended to the other end of the outer periphery (see FIG. 7 (a)).

Figure 8:
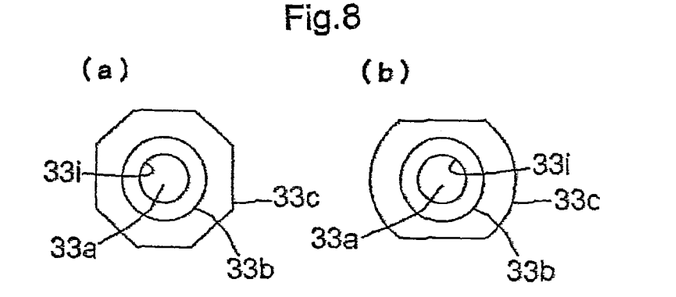
FIG. 8 is a diagram showing still another embodiment of the nut used in the present invention.
Figure 9:
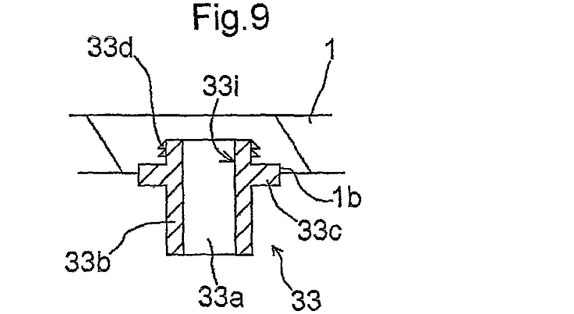
FIG. 9 is a diagram showing one embodiment of a press-fit state of the nut shown in FIG. 6.

Other than the circular shape as shown in FIG. 6, the profile of the flange 33c may be a polygonal shape with approximately even sides (see FIG. 8 (a)). Alternatively, the profile of the flange 33c may be a circular shape with a portion thereof being cut away to give linear portions, for example, a circular shape having a pair of linear portions arranged in parallel (see FIG. 8 (b)). In the case where the profile of the flange 33c is a polygonal shape or a circular shape with linear portions, as shown in FIG. 9, a second recess 1b (hereinafter "recess 1b") having a dimension corresponding to the flange 33c may be formed in advance in the protection panel body made of a resin plate, and by accommodating the flange 33c in the recess 1b, the flange 33c can be prevented from rotating during the screwing of a male screw 34, and thus a reliable fixation can be obtained.

The position and the number of the nut 33 may appropriately selected depending on the dimension and shape of the protection panel body and the material of the protection panel body and an exterior housing 32. For example, the nuts 33 fitted into the respective nut mounting holes 1a and depicted with broken lines in FIG. 1 are arranged at positions adjacent to only opposing shorter sides of the back side rim portion of the protection panel body. However, in the case where a material is used which is likely to cause warpage of the protection panel body due to moisture absorption, a difference in expansion rate as compared with the exterior housing 32 or the like, in order to prevent imbalance in force to secure the protection panel body, it is preferable to provide the nuts 33 also at positions adjacent to long sides of the protection panel body.

The protection panel 1 with a touch input function as described above to which the nuts 33 are attached can be fitted and mounted from outside, as shown in FIG. 3.

The exterior housing 32 mounted with the protection panel 1 with a touch input function may be used in portable information terminal, such as PDA and handheld terminal; OA equipments, such as copy machine and facsimile machine; smartphone, mobile phone, portable gaming device, electronic dictionary, car navigation system, compact PC; and various household appliances, and is provided with a panel fitting portion 32a configured to allow the protection panel 1 with a touch input function to be fitted thereinto from outside (see FIGS. 4 and 5).

Examples of the material for the exterior housing 32 include polymethyl methacrylate (PMMA), acrylonitrile-styrene copolymer resin (AS), acrylonitrile-butadiene-styrene copolymer resin (ABS), cellulose propionate resin, polycarbonate resin (PC), polystyrene resin (PS), polyester resin, polyethylene resin and polymer alloy thereof.

Figure 4:
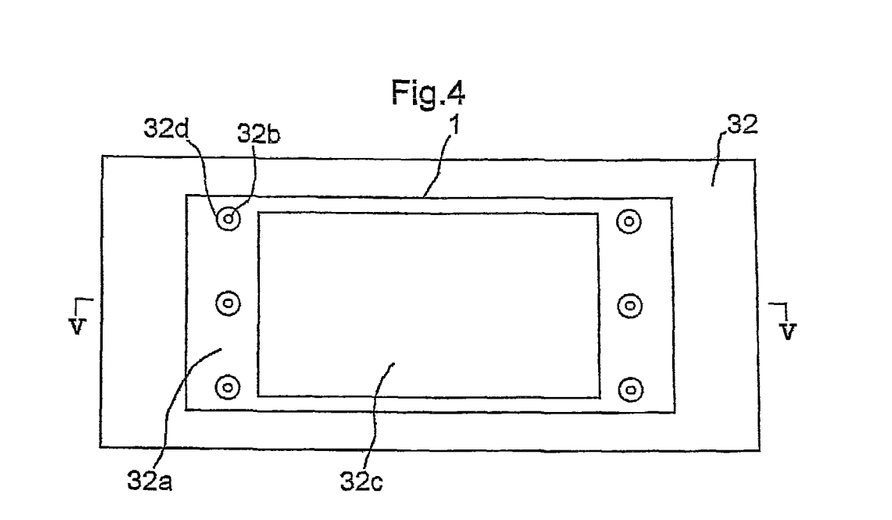
FIG. 4 is a plan view showing one embodiment of an exterior housing used in the present invention.
Figure 5:
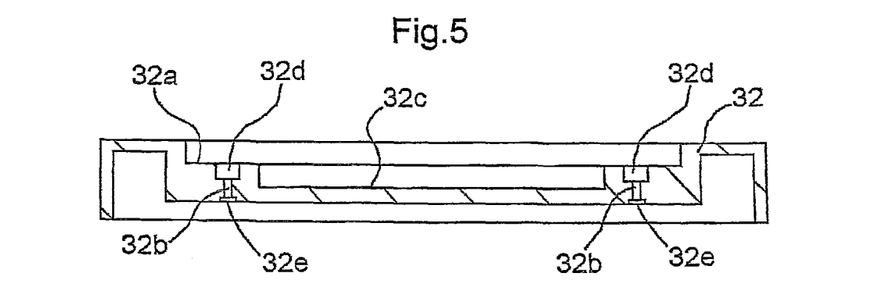
FIG. 5 is a cross-sectional view taken along a line V-V of the exterior housing in FIG. 4.

The depth of the panel fitting portion 32a of the exterior housing 32 shown in FIGS. 4 and 5 is set so as to be approximately equal to the thickness of the protection panel 1 with a touch input function, and the outer face of the fitted protection panel 1 can be in the same plane as the portion of the exterior housing surrounding the outer face. In addition, a recess 32c is formed in a bottom face of the panel fitting portion 32a so as to receive a display unit 20, and a rim portion of the bottom face supports the protection panel 1 with a touch input function.

In the panel fitting portion 32a of the exterior housing 32, through-holes 32b are formed so as to correspond to the female threads 33a of the nut 33 press-fitted into the back side rim portion of the protection panel 1 (see FIGS. 4 and 5).

Figure 14:
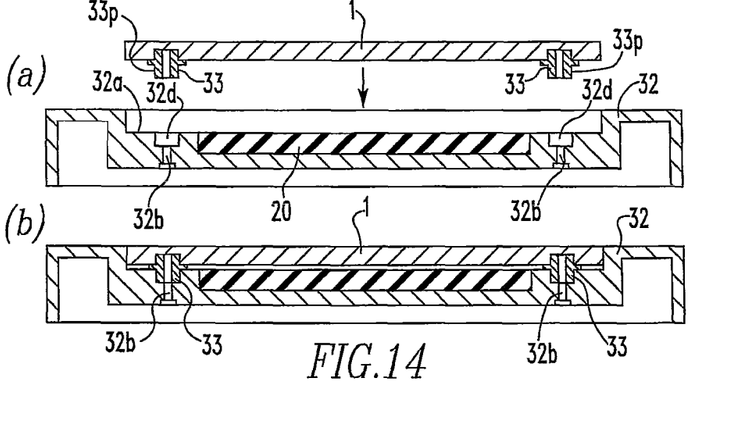
FIG. 14 is a cross-sectional view showing one embodiment of the mounting process of the protection panel with a touch input function according to the present invention.

Then, into the panel fitting portion 32a of the exterior housing 32, the protection panel 1 with a touch input function is fitted in such a manner that the outer face of the protection panel 1 with a touch input function is in the same plane as a portion of the exterior housing surrounding the outer face. In FIG. 14, (a) and (b) are sequential diagrams showing one embodiment of a step for fitting the protection panel 1 with a touch input function into the panel fitting portion 32a of the exterior housing 32 from outside.

Figure 15:
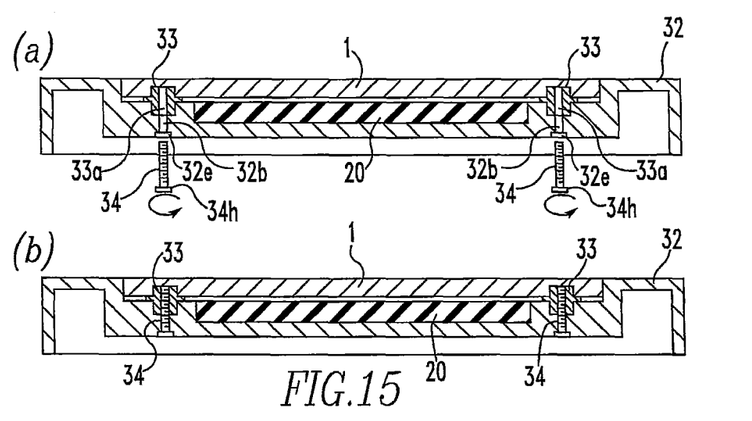
FIG. 15 is a cross-sectional view showing one embodiment of the mounting process of the protection panel with a touch input function according to the present invention.

In addition, into the through-holes 32b formed in the panel fitting portion 32a of the exterior housing 32, the respective male screws 34 are inserted. In FIG. 15, (a) and (b) are sequential diagrams showing one embodiment of a step for screwing the male screws 34 each having a head portion with a larger diameter than that of the through-hole 32b into the respective female threads 33a of the nuts 33, through the respective through-holes 32b formed in the panel fitting portion 32a of the exterior housing 32. In other words, the male screws 34 are first inserted into the through-hole 32b, from inside relative to the exterior housing 32 toward the protection panel 1 with a touch input function. In this case, when a female thread is provided also in the through-hole 32b of the exterior housing 32, the male screw 34 proceeds while making a rotation. Then, the male screws 34 reach the respective nuts 33 through the respective through-holes 32b. Subsequently, these male screws 34 are screwed into the respective nuts 33.

The male screw 34 has the head portion 34h with a larger diameter than that of the through-hole 32b, and is made of materials such as iron, stainless steel, brass and hard plastic, like the nut 33. When the male screws 34a are screwed into the female threads 33a of the respective nuts 33, these nuts 33 and the head portions 34h of the respective male screws 34 sandwich and fix the panel fitting portion 32a of the exterior housing 32 therebetween (see FIG. 15 (b) and FIG. 2). In this manner, the protection panel 1 with a touch input function is fitted and mounted from outside into the panel fitting portion 32a of the exterior housing 32. When a female thread is provided to the through-hole 32b of the exterior housing 32, the exterior housing 32 and the male screw 34 becomes unified, allowing a further strengthened fixation. It should be noted that, when the female thread is provided in the through-hole 32b of the exterior housing 32, a size of the head portion 34h of the male screw 34 may be set to approximately the same as a diameter of the through-hole 32b.

As described above, the nut 33 shown in FIGS. 3 and 6-9 is for obtaining a female thread with the required length by attaching the nut 33 while the nut 33 protrudes from the back side rim portion of the thin plate as the protection panel body. It is preferable that the protruding portion 33p of the nut 33 is received in a first recess 32d (hereinafter "recess 32d") formed in the panel fitting portion 32a of the exterior housing 32 (see FIG. 5), and in this case, the protection panel 1 with a touch input function can be stably mounted. It should be noted that, during the fitting of the protection panel 1 with a touch input function as shown in FIG. 14 (a), the protection panel 1 is bent as less as possible. This is because, if the fitting is performed with the protection panel 1 being bent, the protruding portion 33p of the nut 33 and the recess 32d do not match, and if the nut 33 in this condition is forcefully pressed into the recess 32d, the nut 33 may fall out from the protection panel body, or the protection panel body may have a crack.

In addition, by receiving the protruding portion of the nut 33 in the recess 32d, an advantage is obtained that the electronic device can be made thinner by the amount of the reception. Moreover, it is preferable that a third recess 32e (hereinafter "recess 32e") for receiving the head portion 34h of the male screw 34 be made in the exterior housing 32 (see FIG. 5), and in this case, the electronic device can be made further thinner by the amount of the reception of the head portion 34h of the male screw 34.

Figure 16:
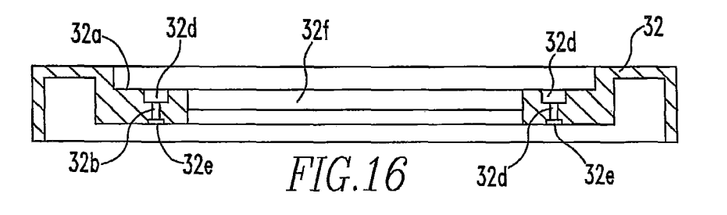
FIG. 16 is a cross-sectional view showing another embodiment of an exterior housing used in the present invention.

Furthermore, with respect to the bottom face of the panel fitting portion 32a of the exterior housing 32, instead of forming the recess 32c for receiving the display unit 20, as shown in FIG. 16, an opening 32f for exposing a screen of the display unit 20 may be formed.

Hereinafter, with reference to FIG. 18, configurations of the protection panel 1 with a touch input function, other than the protection panel body, will be described.

Referring to this drawing, the protection panel 1 with a touch input function includes: a lower electrode panel 3 having the protection panel body, and on an upper face thereof 1u, a lower transparent electrode 5 and lower circuits 7a,7b provided in a portion surrounding the lower transparent electrode 5; an upper electrode sheet 2a having a first flexible transparent insulation film 2af, and on a lower face thereof 2al, an upper transparent electrode 4 provided at a position opposingly corresponding to a position of the lower transparent electrode 5, and upper circuits 6a-6d,7c,7d provided in a portion surrounding the upper transparent electrode 4; and a decorative sheet 2b having a second flexible transparent insulation film 2bf and a decorative layer with a picture 17 for concealing the lower circuits 7a,7b and the upper circuits 6a-6d,7c,7d to form a transparent window 18.

The material of the protection panel body is as described above. Alternatively, to a face of such a plate, on which a lower transparent electrode of these plate is formed, may be attached a film made of engineering plastics, such as polycarbonates, polyamides, and polyetherketones; or acrylic, polyethylene terephthalate and polybutylene terephthalate, to thereby obtain the lower electrode panel 3.

In addition, examples of the material of the first flexible transparent insulation film 2af of the upper electrode sheet 2a include engineering plastics, such as polycarbonates, polyamides and polyetherketones; and acrylic, polyethylene terephthalate, and polybutylene terephthalate.

The upper electrode sheet 2a and the lower electrode panel 3 are adhered at rim portions thereof so that the transparent electrodes 4,5 are opposingly arranged with a gap. Each of the transparent electrodes 4,5 in a rectangular shape is formed as a film of metal oxide, such as tin oxide, indium oxide, antimony oxide, zinc oxide, cadmium oxide, and indium tin oxide (ITO) or a composite membrane formed mainly of the metal oxide described above, or a film of metal, such as gold, silver, copper, tin, nickel, aluminum, and palladium, by vacuum deposition method, sputtering method, ion plating method, or CVD method.

The upper electrode sheet 2a has the upper transparent electrode 4 and strip-shaped parallel bus bars 6a,6b as upper circuit made of a conductive paste of metal, e.g., gold, silver, copper and nickel, or alternatively, a paste of carbon. The lower electrode panel 3 has the lower transparent electrode 5 and strip-shaped bus bars 7a,7b as lower circuit orthogonal to the bus bars 6a,6b. Examples of a method for fabricating each of the strip-shaped bus bars 6a,6b,7a,7b include printing method, such as screen printing, offset printing, gravure printing, and flexographic printing; photoresist method; and brush painting method.

It should be noted that the bus bars 6a,6b,7a,7b extend to a single connecting portion 8 provided in a rim portion of the upper electrode sheet 2a. In FIG. 1, the bus bars 6a,6b on the upper electrode sheet 2a extend to electrode ends 6d,6c, respectively, of the connecting portion 8. The bus bars 7a,7b of the lower electrode panel 3 extend to the portions 7e,7f in the lower circuit, respectively, which are then connected using a conductive adhesive (not shown) to electrode ends 7c,7d, respectively, formed in the connecting portion 8 of the upper electrode sheet 2a in parallel with the electrode ends 6d,6c.

Through holes 9a-9d are formed in the lower electrode panel 3 so as to correspond to the respective electrode ends 6c,7c,6d,7d in the connecting portion 8.

In addition, through a conductive adhesive in the through holes 9a-9d, an FPC (flexible print circuit board) is conductive with the electrode ends 6c,7c,6d,7d. There is no limitation with respect to the FPC, as long as electric signals can be taken out from the through holes 9a-9d. One preferable example is an FPC 10 having four metal pins 11-14 standing on a connecting end side of the FPC which pins correspond to the respective through holes 9a-9d. However, the FPC is not limited to those described in the paragraph of "Background art".

Moreover, to a surface of the upper electrode sheet 2a, the decorative sheet 2b having the transparent window 18 is stuck. The decorative sheet 2b is formed of a second flexible transparent insulation film 2bf including engineering plastic, such as polycarbonates, polyamides and polyetherketones; or film such as those made of acrylic, polyethylene terephthalate and polybutylene terephthalate, on which a decorative layer is formed with the picture 17 so as to conceal a portion surrounding the transparent window 18, i.e., the upper circuit, the lower circuit and the like.

For the decorative layer, a colored ink may be used, which includes: resins, such as polyvinyl resin, polyamide resin, polyester resin, polyacrylic resin, polyurethane resin, polyvinyl acetal resin, polyester urethane resin, or alkyd resin as a binder; and pigment or dye of an appropriate color as a coloring agent. Examples of a method for fabricating the decorative layer include regular printing method, such as screen printing, offset printing, gravure printing, and flexographic printing. Especially, for polychrome printing and gradation expression, the offset printing and the gravure printing are suitable.

In addition, the decorative layer may also be a metal film layer, or alternatively, a combination of a picture print layer and a metal film layer. The metal film layer as the decorative layer is for expressing metallic luster and is formed by vacuum deposition method, sputtering method, ion plating method, plating method or the like. In this case, depending on the desired color of metallic luster, a metal is used which may be selected from, for example, aluminum, nickel, gold, platinum, ferrochrome, copper, tin, indium, silver, titanium, lead, and zinc, and alloys or compounds thereof. Typically, a thickness of the metal film layer is approximately 0.05 µm.

Further, the decorative sheet 2b is stuck together with an entire front face of the upper electrode sheet 2a, to form a movable sheet 2. When a surface of the decorative sheet 2b is pressed with a finger, stylus or the like, the movable sheet 2 as a whole is bent downward, and as a result, the transparent electrodes 4,5 provided on the opposing faces of the upper electrode sheet 2a and the lower electrode panel 3 are brought into contact, and thus an input position is detected. The adhesion layer to be used for sticking may be made of, for example, polyacrylic resin, polystyrene resin, polyimide resin, vinyl chloride, vinyl acetate, acrylic copolymer or the like. Examples of a method for fabricating the adhesion layer 5d include regular printing method, such as screen printing, offset printing, gravure printing, and flexographic printing.

The protection panel 1 with a touch input function shown in FIG. 18 is used for the resistive film type touch panel. Alternatively, the protection panel 1 with a touch input function according to the present invention may be used for other types, for example a capacitance type touch panel. In any of these cases, the protection panel body is used as the lowermost layer, and there may be provided a decorative sheet having a decorative layer with a picture for concealing a rim portion to form a transparent window.

It should be noted that, by combining desired embodiments from among the various embodiments described above, combination of effects each specific to corresponding embodiment can be exerted. The present invention relevant to the preferable embodiment is fully described with reference to the accompanying drawings, and various alterations and modifications of this preferable embodiment are obvious for those skilled in the art. Such alterations and modifications should be construed to be included in the present invention as long as they do not deviate from the scope of the claim of the present invention.

INDUSTRIAL APPLICABILITY

The structure and method for mounting the protection panel according to the present invention can be applicable to a protection panel with a touch input function used in portable information terminal, such as PDA and handheld terminal; OA equipments, such as copy machine and facsimile machine; smartphone, mobile phone, portable gaming device, electronic dictionary, car navigation system, compact PC; and various household appliances.

The invention claimed is:

1. A structure for mounting a protection panel with a touch input function for protecting an electronic device display window which protection panel is mainly formed of a protection panel body made of resin, in which structure the protection panel is fixed to a panel fitting portion of an exterior housing from outside, the structure comprising:

a plurality of nuts each having a female thread formed in an inner periphery thereof; and
a plurality of male screws,
wherein
the nuts are inserted in respective nut mounting holes formed in a back side rim portion of the protection panel body,
the protection panel is fitted into the panel fitting portion of the exterior housing from outside so that an outer face of the protection panel is in the same plane as a portion of the exterior housing surrounding the outer face, and
the male screws are screwed into the respective female threads of the nuts through respective through-holes formed in the panel fitting portion of the exterior housing, and
wherein
each of the nuts includes a protruding portion which protrudes from the protection panel body, when the nut is inserted in the nut mounting hole,
the panel fitting portion includes first recesses, dimension of each of which corresponds to a shape of the protruding portion of the nut, and
the protection panel is fitted into the panel fitting portion with the protruding portions of the nuts received in the respective first recesses.

2. The structure for mounting a protection panel with a touch input function according to claim 1, wherein
the protection panel with a touch input function comprises:
a lower electrode panel including
the protection panel body which is non-flexible,
a lower transparent electrode, and
a lower circuit provided in a portion surrounding the lower transparent electrode,
the lower transparent electrode and the lower circuit being formed on an upper face of the protection panel body;
an upper electrode sheet including
a first flexible transparent insulation film,
an upper transparent electrode provided at a position opposingly corresponding to a position of the lower transparent electrode, and
an upper circuit provided in a portion surrounding the upper transparent electrode,
the upper transparent electrode and the upper circuit being formed on a lower face of the first flexible transparent insulation film,
the upper electrode sheet being stuck to the lower electrode panel at rim portions to allow the upper transparent electrode and the lower transparent electrode to be opposed to each other; and
a decorative sheet including
a second flexible transparent insulation film, and
a decorative layer for concealing the lower circuit and the upper circuit to form a transparent window,
the decorative layer being provided on at least one face of the second flexible transparent insulation film,
the decorative sheet being stuck to the upper face of an upper electrode sheet.

3. The structure for mounting a protection panel with a touch input function according to claim 1, wherein
each of the nuts includes a cylindrical barrel portion having the female thread in the inner periphery thereof, and a flange projecting outwardly from the barrel portion,
the protection panel body includes second recesses, dimension of each of which corresponds to a profile of the flange, and
the profile of the flange is a polygonal shape or a circular shape with linear portions.

4. The structure for mounting a protection panel with a touch input function according to claim 1, wherein
each of the male screws includes a body portion to be screwed into the corresponding nut, and a head portion with a larger diameter than that of the body portion,
the exterior housing includes third recesses, dimension of each of which corresponds to a shape of the head portion, the third recesses being formed at positions corresponding to the through-holes on the opposite face of the panel fitting portion, and
each of the male screws is screwed into the corresponding nut with the head portions received in the respective third recesses.

5. A method for mounting a protection panel with a touch input function for protecting an electronic device display window which protection panel is mainly formed of a protection panel body made of a resin plate, by fitting the protection panel into a panel fitting portion of an exterior housing from outside so that an outer face of the protection panel is in the same plane as a portion of the exterior housing surrounding the outer face, the method comprising:

a step of inserting nuts each having a female thread formed in an inner periphery thereof in respective nut mounting holes formed in a back side rim portion of the protection panel body;
a step of fitting the protection panel into the panel fitting portion of the exterior housing from outside; and
a step of screwing male screws into the respective female threads of the nuts through respective through-holes formed in the panel fitting portion of the exterior housing,
wherein
each of the nuts includes a protruding portion which protrudes from the protection panel body, when the nut is inserted in the nut mounting hole,
the panel fitting portion includes first recesses, dimension of each of which corresponds to a shape of the protruding portion of the nut, and
the protection panel is fitted into the panel fitting portion with the protruding portions of the nuts received in the respective first recesses.

* * * * *